(12) United States Patent
Alsberg

(10) Patent No.: US 10,527,293 B2
(45) Date of Patent: Jan. 7, 2020

(54) RADIANT PANEL WITH VARIED CHANNEL GEOMETRIES FOR ENHANCED RETENTION OF TUBING

(71) Applicant: Warmboard, Inc., Aptos, CA (US)

(72) Inventor: Terry Wayne Alsberg, Capitola, CA (US)

(73) Assignee: WarmBoard, Inc., Aptos, CA (US)

( * ) Notice: Subject to any disclaimer, the term of this patent is extended or adjusted under 35 U.S.C. 154(b) by 0 days.

(21) Appl. No.: 15/235,539

(22) Filed: Aug. 12, 2016

(65) Prior Publication Data

US 2017/0045236 A1   Feb. 16, 2017

Related U.S. Application Data

(60) Provisional application No. 62/204,766, filed on Aug. 13, 2015.

(51) Int. Cl.
*F24D 3/14* (2006.01)

(52) U.S. Cl.
CPC .............. *F24D 3/141* (2013.01); *F24D 3/14* (2013.01); *F24D 3/142* (2013.01); *Y02B 30/24* (2013.01)

(58) Field of Classification Search
CPC . F24D 3/14; F24D 3/142; F24D 3/148; F24D 3/141; F24F 5/0089; F24F 5/0092
See application file for complete search history.

(56) References Cited

U.S. PATENT DOCUMENTS 4,852,645 A * 8/1989 Coulon .................. F28F 13/00
165/180

5,292,065 A   3/1994 Fiedrich
5,497,826 A   3/1996 Ingram
(Continued)

FOREIGN PATENT DOCUMENTS

FR   2859744   *   3/2005
GB   2024400   *   6/1979

OTHER PUBLICATIONS

Birarda, FR2859744MT (English Translation), Mar. 2005.*

*Primary Examiner* — Eric S Ruppert
(74) *Attorney, Agent, or Firm* — Fenwick & West LLP

(57) ABSTRACT

A radiant panel having a channel or groove is manufactured using, for example, a simple U shaped channel with substantially parallel vertical sides is one embodiment. Because varied diameter tubing pressed into curved channels of varying radius will change their shape from round to oval by different amounts, channel width will be reduced at curved channel areas as appropriate, in light of tubing size and channel radius. This reduction in curved channel width compared to straight channel width will allow for a consistent friction force to be developed upon pressing the tubing into a channel, for retention purposes, regardless of whether the channel is straight or curved. In other embodiments the depth of groove may be varied as well to allow for the increased vertical dimension of tubing which is deformed from round to oval by bending forces. By varying the depth as necessary, tubing can be installed consistently flush with the surface of the radiant panel which enhances the installation of covering materials whether they may be finish floor materials or wall or ceiling finishes. Varying width and depth will also tend to maximize the contact area of tube to conductive surface, thereby improving the flow of heat from tube to radiant panel.

19 Claims, 4 Drawing Sheets

(56) References Cited

U.S. PATENT DOCUMENTS

| | | | |
|---|---|---|---|
| 5,788,152 A | 8/1998 | Alsberg | |
| 5,957,378 A * | 9/1999 | Fiedrich | F24D 3/14 |
| | | | 165/45 |
| 6,533,185 B1 | 3/2003 | Muir | |
| 9,404,665 B1 * | 8/2016 | Kayhart | F24D 3/14 |
| 2009/0101306 A1 * | 4/2009 | Reis | F28F 13/00 |
| | | | 165/56 |

* cited by examiner

RADIANT PANEL WITH VARIED CHANNEL GEOMETRIES FOR ENHANCED RETENTION OF TUBING

RELATED APPLICATIONS

This application claims priority from U.S. provisional application No. 62/204,766 filed on Aug. 13, 2015 which is incorporated by reference herein in its entirety.

FIELD

The features described herein relate to the channel configuration of modular radiant heating panels.

BACKGROUND

Hydronic radiant panel heating is a popular form of heating for habitable structures. This form of heating typically incorporates tubing carrying a heated fluid, that transfers heat from the tubing to a panel, which then conducts that heat across the surface of the panel, thereby transferring heat to the habitable space within the structure. These panels are most commonly a part of a floor assembly but can also be a part of wall or ceiling assemblies.

Historically, radiant panels were largely comprised of circuits of tubing forming continuous serpentine or spiraling loops embedded in a slab comprised of Portland cement concrete or gypsum based concrete. Recent developments in hydronic radiant heating have focused on arrays of modular panels that rely on aluminum or other conductive materials to distribute heat from the tubing across the surface. Some systems have been manufactured with the tubing already permanently secured within the panel. In these instances, while the tubing may be securely contained within each panel, numerous connections must be made between individual panels within an array in order to complete a circuit through which the heated fluid may be circulated. The inherent challenge in these systems is that each connection adds to the labor at time of installation, and the likelihood of leaks multiplies with the number of connections, each of which must be accomplished without defect and maintain their integrity for the lifetime of the structure.

Systems seek to avoid this challenge by installing the tubing after the panel array is installed in the structure. This allows the tubing to be continuous, with the exception being the connections at the beginning and end of each loop, but without connections between individual panels, thereby reducing labor and the likelihood of leaks. In most of these continuous loop systems, the tubing is retained in a modular system of channels designed to receive and securely retain the tubing in contact with the conductive material of the panel. The conductive function of the panel is enhanced when the contact area of the tubing with the conductive panel is maximized.

Various forms of polymer tubing are used in these systems with a common being cross-linked polyethylene often known as PEX tubing. It is in the nature of PEX, and other polymer tubing typically used, that there is memory in the tubing. Memory is the property of polymers that causes them to tend to return to their original molded shape after being deflected to from that shape. Memory causes the tubing when deflected to act like a spring. Memory tends to resist both twisting and bending. Accordingly, due to the spring-like nature, without positive means for retaining the tubing in the channels, it may become dislodged from the channels. Virtually all of these systems incorporate features in their systems to keep the tubing firmly in place. The means for retaining the tubing in channels in some systems is a mechanical feature that causes a narrowing and therefore a restriction at the top of the channel causing the tubing once pressed past the restriction, to be restrained from returning back pass the restriction and out of the channel. To do so limits the efficiency of forming the channel thereby driving up the cost of manufacturing. Other panel systems use adhesives. While adhesives work, they can add cost, can be messy, and even when used, the tubing may need to be temporarily restrained in the groove, until the adhesive achieves a proper cured strength, adding further cost. Some systems rely on an interference fit between the tube and the channel by slightly under-sizing the channel relative to the tubing size so as to create friction with the tubing, see U.S. Pat. No. 5,788,152 to Alsberg which is incorporated by reference in its entirety herein. The problem with this approach is that radiant heating panel systems tend to have a channel pattern, which requires the tubing to be straight in some areas of the panel and turn through an arc at other areas. When any tubing is bent into an arc, the bending forces tend to deform the tubing cross section from its normal round profile to a more oval shape, which tends to make the tubing narrower relative to the width of the channel where bent and therefore have less of an interference fit or even none. Those systems that have relied on the interference fit have found that the tubing is not well retained at curved portions of the channels and have used either adhesives, mechanical fastenings or both to overcome this challenge. These approaches to a solution have caused increased labor and material costs. In some cases, use of tubing with a deformable layer within the wall of the tubing has been employed. Three-layered PEX-Aluminum-PEX is a common form of this tubing used. Due to the malleability of the aluminum, this type of tubing may be better retained than pure polymer tubing. But such tubing is nearly twice or more of the price of simple one layer polymer tubing. Even with the deformable layer, retention in the channel may still be compromised.

SUMMARY OF THE EMBODIMENTS

In a typical embodiment, a channel profile is manufactured without restriction at the top of the channel thereby maximizing the number of channel forming techniques possible for maximum manufacturing efficiency. A simple "U" shaped channel with substantially parallel vertical sides is one embodiment that achieves this purpose. The simple "U" shaped profile, without restriction at its opening, allows for machining channels in substrates with tools that rotate vertically or horizontally or mixing the two methods for optimum manufacturing cost control. In those instances where a channel is molded into a substrate, the simple "U" shaped channel, as opposed to a channel with restriction at its opening, allows for the draft essential to efficiently molded parts.

Because varied diameter tubing pressed into curved channels of varying radius will change their shape from round to oval by different amounts, channel width will be reduced at curved channel areas as appropriate, in light of tubing size and channel radius. This reduction in curved channel width compared to straight channel width will allow for a consistent friction force to be developed upon pressing the tubing into a channel, for retention purposes, regardless of whether the channel is straight or curved. In other embodiments the depth of groove may be varied as well to allow for the increased vertical dimension of tubing which is deformed from round to oval by bending forces. By varying the depth as necessary, tubing can be installed consistently flush with the surface of the radiant panel which enhances the installation of covering materials whether they may be finish floor materials or wall or ceiling finishes. Varying width and depth as described above will also tend to maximize the contact area of tube to conductive surface, thereby improving the flow of heat from tube to radiant panel.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the subject matter.

BRIEF DESCRIPTION OF THE DRAWINGS

Embodiments will be more fully comprehended from the following detailed description and accompanying drawings in which.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An embodiment is now described with reference to the figures where like reference numbers indicate identical or functionally similar elements.

Figure 1:
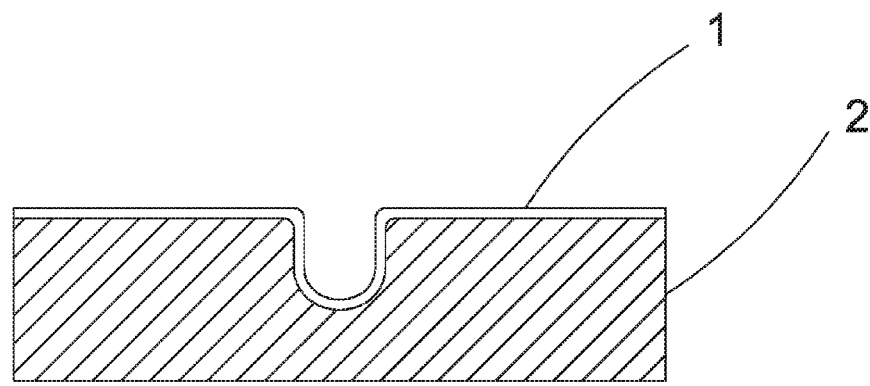
FIG. 1 is a section drawing through one embodiment of a radiant panel with a channel that can be straight or curved, that has a substantially semicircular bottom profile with substantially vertical side profile ending at a radiused intersection with the surface of the panel at the opening through which the tubing is installed

Referring now to FIG. 1, most modular radiant panels are comprised of two or more materials, typically a conductive layer (1) and a support layer (2). The support layer may be wood, wood fiber, cementitious materials, plastic, foam or various other materials capable of performing the support function. Because the conductive layer is commonly aluminum sheet or other comparatively thin conductor such as copper sheet or graphite fiber, the shape and dimension of the channels, is largely determined by the shape and dimensions of the channels in the support material, not the relatively conformable conductive layer.

For the purposes of this description, it will be assumed that the panels into which channels are formed are horizontal and the channels are formed from the top of the panel. This however does not restrict the process to only horizontal manufacture or for the panels to be used only in a horizontal position with the channel openings on top of the panel. Other orientations for the panel during manufacture or during installation in a structure are of course possible. Channels may be formed in some of these materials by machining with vertically rotating tools such as dado blades or with horizontally rotating tools such as router bits.

Horizontally rotating router bits can be used to form a restriction in the channel but only if the tool enters and leaves the panel from the edge of a panel. If the router bit enters vertically into the panel, that would prevent the formation of a restriction because the router bit itself would machine away the restriction upon entering and exiting the panel from above. Router bits are by their nature much slower than other channel forming techniques and the computer numerically controlled routers that employ them are expensive and complicated pieces of capital equipment.

Dado blades, which rotate vertically, are much faster production tools. This is because they are much larger in diameter than router bits, which allows much higher tip speeds and therefore they machine wood and other substrates much faster. However they are by their vertically rotating nature incapable of creating a horizontal restriction.

With some materials capable of providing the needed support function such as plastic, foam, cementitious materials or other moldable materials, because the molding tool must be capable of being removed from the molded part, any form of restriction at the top of a channel would create negative draft and therefore, inherently prevent the molding of channels.

It is for these reasons that the example of a typical "U" shaped channel depicted in FIG. 1 is so common in the many variations of radiant panels.

Figure 2:
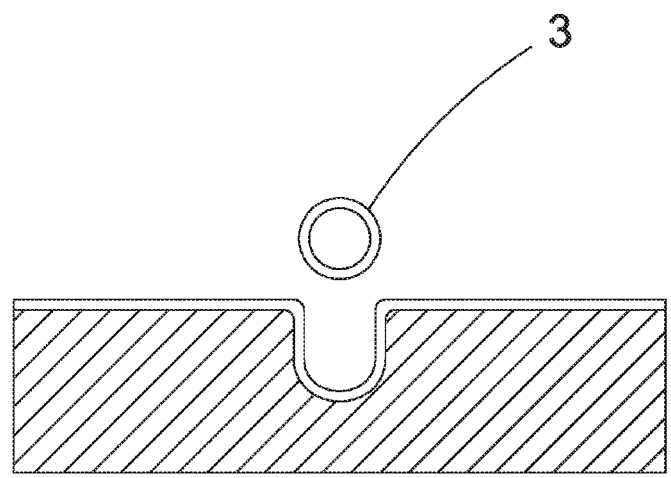
FIG. 2 is a section drawing of a substantially round tube prior to being pressed into a straight channel

Referring now to FIG. 2, it shows the common round shape of hydronic tubing (3) employed in most radiant heating systems. The round shape is typically formed by an extrusion die, as tubing is being extruded. Like many plastics, the cross-linked polyethylene (PEX) or other polymers utilized in hydronic tubing tend to have what is termed "memory" which resists deformation from its straight, untwisted and round configuration that was its cured configuration immediately after extrusion.

Polymers that exhibit "memory", when deformed, act like springs. They develop internal forces that resist the deforming force. It is this "memory", this tendency to return to the original round shape, which creates the side force, which produces the restraining friction that retains the tubing in a channel in many systems. It is this "memory", which tends to make tubing spring out of a curved channel as the internal forces in the tubing tend to return it to its originally formed straight configuration. It is also this "memory" that causes any twisting that may inadvertently occur during the tubing installation process, to likewise cause the tubing to spring from a channel.

The polymers often utilized in forming hydronic tubing tend to be Hookean in nature, as they tend to obey Hooke's law so long as the deformations that they are subject to occur within their elastic range. As such, the side force essential to retention in channels is in linear relationship to the deformation.

It is in part largely to offset the Hookean nature of the subject polymers that PEX-aluminum-PEX tubing was developed. The aluminum is quite malleable and the normal bending forces it is subjected to operate in its inelastic range. In other words, once deformed, it tends to maintain that deformation in a non-Hookean fashion. In other words, the aluminum tends to maintain a new deformed shape and counterbalance the Hookean forces that want to unbend or untwist a tube to return to its prior unbent or untwisted configuration.

Figure 3:
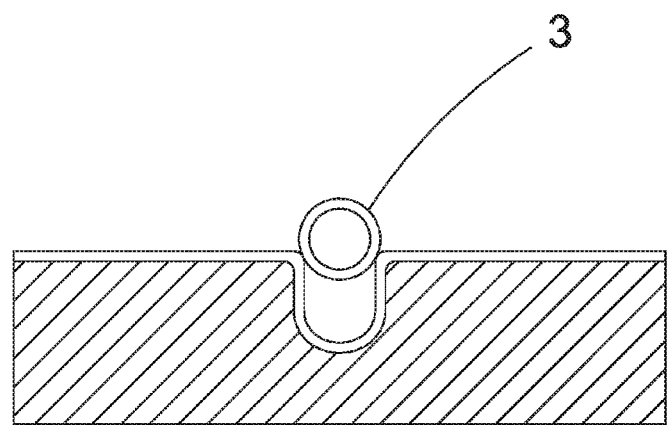
FIG. 3 is a section drawing of a tube engaging with a straight channel
Figure 4:
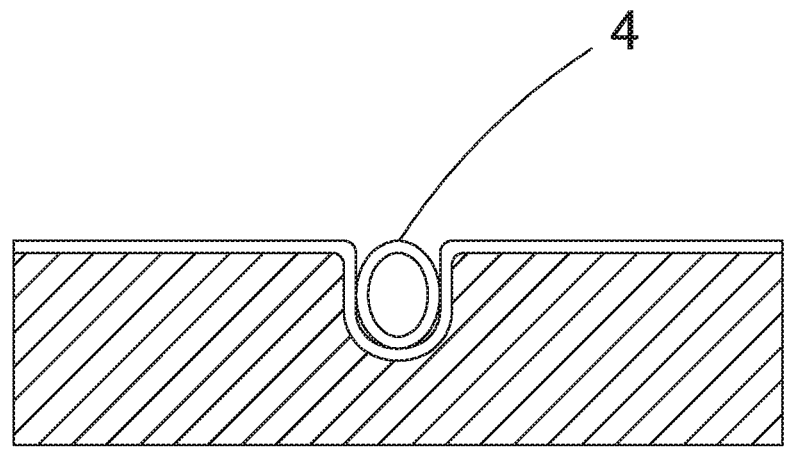
FIG. 4 is a section drawing of tubing in place in a straight channel indicating the oval deformation that creates the side force and therefore the retaining friction on the tube.

Referring now to FIGS. 3 & 4, it is seen how pressing a round tube (3) into a channel whose width is somewhat less than the diameter of the tubing, forces it into slightly deformed oval shape (4). Due to its Hookean nature, the deformation causes a side force, and therefore sufficient force of friction needed to ensure that the tube remains in the correct position in the channel.

Figure 5:
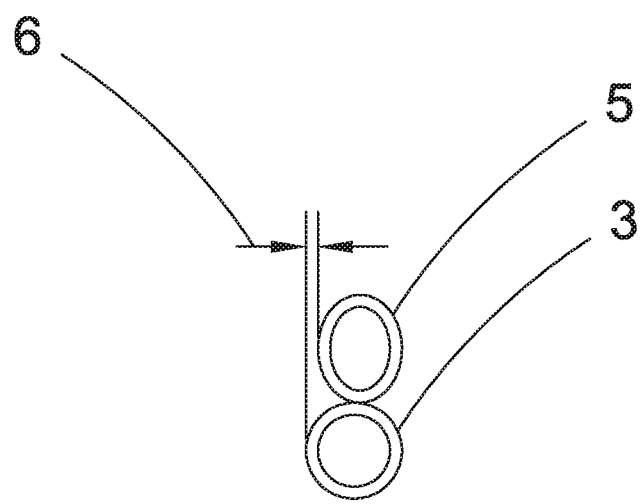
FIG. 5 Shows the normal round shape of a straight section of tubing compared to one that has become more oval shape due to bending through an arc.

Referring to FIG. 5, we see the shape of a tube after being forced into a curved configuration typical at portions of a radiant panel. We can see that merely bending the tubing causes an oval shape (5) and a dimensional change (6) similar to the round tube pressed into a straight channel. This means that when pressed into curved channel, no additional side force will be generated due to the placing of a curved tube into a curved channel of the same width as the straight channel.

Figures 6, 6A:
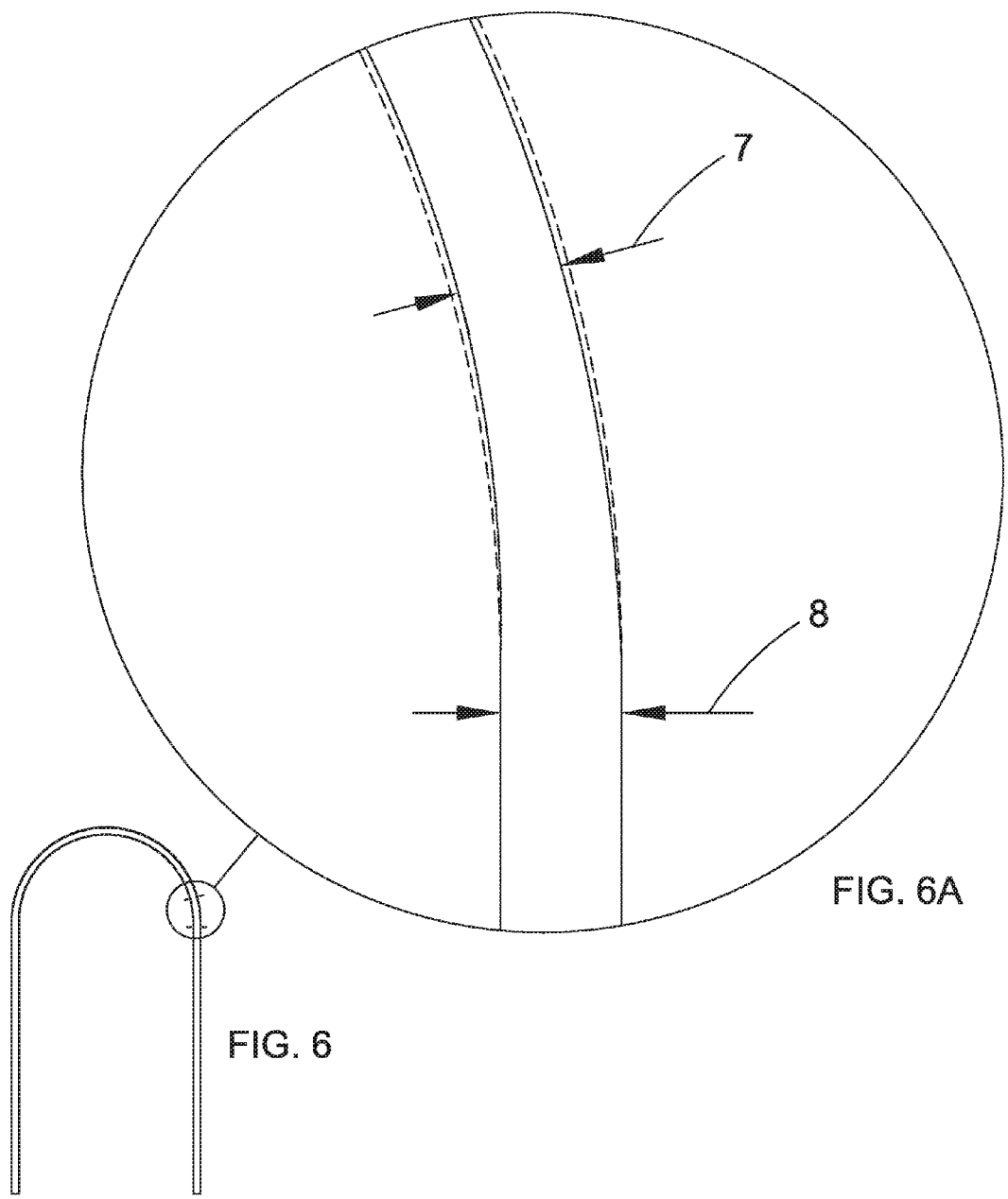
FIGS. 6 & 6A Show the variation in channel width between straight channels and curved channels that is provided by embodiments to ensure similar side force in both types of channels.

Referring to FIGS. 6 and 6A, which is a view of a radiant panel channel from above, we can see which portions of a radiant panel channel pattern will have reduced width. In embodiments this problem of reduced or non-existent friction force is solved by reducing the width of the curved portions of the channels by a sufficient amount (7) to have the same or a similar degree of incremental deformation imposed on the tubing, independent of the deformation due to bending by itself prior to being inserted into a curved channel. Therefore the side force developed by pressing the tubing into the curved channels will be similar to the side force generated in the straight portion (8) of the channels. Because the tubing is even more ovalized than in the straight channels, this may necessitate increasing the depth of the channel as well to allow for the increase in vertical dimension of the tubing.

Figure 7:
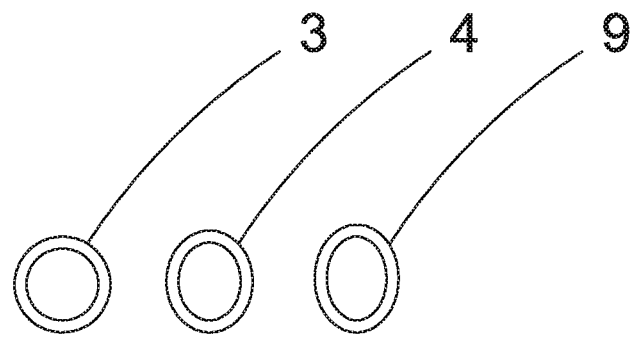
FIG. 7 Shows the relative progression of tubing shapes from one with the original round shape to that of one after being pressed into a straight channel and one after being pressed into a reduced width curved channel.

Referring to FIG. 7 we can see the progression of shapes from un-deformed (3) to adequate deformation (4) in a straight section for optimum interference fit, to adequate deformation (9) in a curved section for optimum interference fit.

Figure 8:
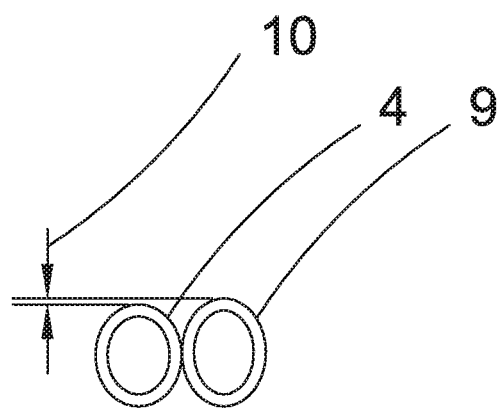
FIG. 8 Shows the increase in vertical dimension of tubing pressed into a straight channel compared to tubing pressed into a reduced width curved channel.

Referring to FIG. 8, we can see the incremental increase in depth (10) required in a curved channel relative to a straight channel, for optimum tubing-to-panel contact area for efficient heat flow and to result in a flush fit with the surface of a panel.

While the one embodiment will be employed in the radiant heating panel industry, others may make use of embodiments in other industries and applications where straight sections combined with curved sections may take advantage of the approximately constant side force created by variable channel width.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed:

1. A first radiant panel comprising,
a groove in the first radiant panel, the groove having a first portion that is straight and a second portion that is curved, said groove including,
a first side having a first top end and a first bottom end,
a second side, parallel to said first side, having a second top end and a second bottom end,
a rounded bottom that connects said first bottom end and said second bottom end, wherein said first and second top end form an opening;
the first portion having a first width selected such that a tube positioned within the groove is deformed by a first amount to provide a first frictional force between the tube and the first portion of the groove; and
the second portion having a second width, the second width is smaller than the first width, and selected such that the tube is deformed by a second amount above a deformation of the tube due to bending of the tube upon placement in the groove, to provide a second frictional force between the tube and the second portion of the groove.

2. The first radiant panel of claim 1,
wherein the second frictional force to the tube in the second portion that is similar to the first frictional force to the tube in the first portion.

3. The first radiant panel of claim 2, wherein the groove includes a conductive layer positioned between the first radiant panel and the tube.

4. The first radiant panel of claim 3, wherein said conductive layer is aluminum.

5. The first radiant panel of claim 3, wherein said conductive layer is copper.

6. The first radiant panel of claim 3, wherein said conductive layer is graphite fiber.

7. The first radiant panel of claim 2, said first portion having a first depth and said second portion having a second depth, said second depth is larger than said first depth, said first and second depths being perpendicular to a surface plane of the first radiant panel.

8. The first radiant panel of claim 7, wherein said second depth enables the tube to be flush with a surface plane of the first radiant panel.

9. The first radiant panel of claim 1, said first portion having a first depth and said second portion having a second depth, said second depth is larger than said first depth, said first and second depths being perpendicular to a surface plane of the first radiant panel.

10. The first radiant panel of claim 9, wherein said second depth enables the tube to be flush with a surface plane of the first radiant panel.

11. The first radiant panel of claim 1, further comprising:
a second radiant panel, said second radiant panel comprising a straight groove in the second radiant panel, the straight groove being straight and having a first end that abuts an end of the first portion of the first radiant panel.

12. The first radiant panel of claim 2, wherein said tube has a substantially circular cross section within said first portion of said groove.

13. A radiant panel system comprising,
a first radiant panel having a curved groove in the first radiant panel, the curved groove having a curved portion and having a second width;
wherein said curved groove including,
a first side having a first top end and a first bottom end,
a second side, parallel to said first side, having a second top end and a second bottom end,
a rounded bottom that connects said first bottom end and said second bottom end, wherein said first and second top end form an opening and a distance between said first and second top end is said second width; and
a second radiant panel, said second radiant panel comprising a straight groove in the second radiant panel, the straight groove being straight, having a first width and having a first end that abuts the curved groove of the first radiant panel;
wherein said straight groove including,
a first side having a first top end and a first bottom end,
a second side, parallel to said first side, having a second top end and a second bottom end,
a rounded bottom that connects said first bottom end and said second bottom end, wherein said first and second top end form an opening and a distance between said first and second top end is said first width;
wherein the second width is smaller than the first width, the first width selected such that a tube positioned within the curved groove and the straight groove is deformed by a first amount to provide a first frictional force between the tube and the straight groove, and the second width selected such that the tube is deformed by a second amount above a deformation of the tube due to bending of the tube prior to placement in the curved groove, to provide a second frictional force between the tube and the curved portion of the curved groove.

14. The radiant panel system of claim 13, wherein an end of the curved grooved has a width substantially equal to the first width and the width of the curved groove tapers to the second width.

15. The radiant panel system of claim 13,
wherein the second frictional force to the tube in the first radiant panel is similar to the first friction force to the tube in the second radiant panel.

16. The radiant panel system of claim 13, wherein the curved groove includes a conductive layer positioned between the first radiant panel and the tube.

17. The radiant panel system of claim 13, said straight groove having a first depth and said curved groove having a second depth, said second depth is larger than said first depth, said first and second depths being perpendicular to a surface plane of the first radiant panel.

18. The radiant panel system of claim 17, wherein said second depth enables the tube to be flush with a surface plane of the first radiant panel.

19. The radiant panel system of claim 15, wherein said tube has a substantially circular cross section within the straight groove.

* * * * *

UNITED STATES PATENT AND TRADEMARK OFFICE
CERTIFICATE OF CORRECTION

PATENT NO. : 10,527,293 B2
APPLICATION NO. : 15/235539
DATED : January 7, 2020
INVENTOR(S) : Terry Wayne Alsberg It is certified that error appears in the above-identified patent and that said Letters Patent is hereby corrected as shown below:

In the Claims

Column 8, Claim 13, Line 6, delete "due to bending of the tube prior to placement" and insert --due to bending of the tube upon placement--

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*